United States Patent
Tomioka

(10) Patent No.: US 6,378,807 B1
(45) Date of Patent: Apr. 30, 2002

(54) AIRCRAFT INSTALLED SNOW REMOVER

(76) Inventor: Okinaga Tomioka, 20-1, Tomioka 1-chome, Koto-ku, Tokyo (JP)

( * ) Notice: Subject to any disclaimer, the term of this patent is extended or adjusted under 35 U.S.C. 154(b) by 0 days.

(21) Appl. No.: 09/605,538

(22) Filed: Jun. 29, 2000

(30) Foreign Application Priority Data

Mar. 3, 2000 (JP) .............................. 12-058987

(51) Int. Cl.⁷ ............................................. B64D 15/00
(52) U.S. Cl. ............................... 244/134 R; 244/134 C
(58) Field of Search ..................... 244/134 R, 134 C, 244/134 B, 134 E, 207

(56) References Cited

U.S. PATENT DOCUMENTS

| | | | | |
|---|---|---|---|---|
| 2,328,079 A | * | 8/1943 | Goodman | 244/134 B |
| 2,396,684 A | * | 3/1946 | Chadsey | 244/134 B |
| 3,014,814 A | * | 12/1961 | McConica | 244/134 R |
| 4,895,322 A | * | 1/1990 | Zieve | 244/134 R |
| 5,134,266 A | * | 7/1992 | Peppard | 244/134 R |
| 5,849,099 A | * | 12/1998 | Mcguire | 134/10 |
| RE36,215 E | * | 6/1999 | Rosenthal | 244/134 R |
| 6,029,934 A | * | 2/2000 | Foster | 244/134 C |

* cited by examiner

Primary Examiner—Charles T. Jordan
Assistant Examiner—Gabriel S Sukman
(74) Attorney, Agent, or Firm—Foley & Lardner

(57) ABSTRACT

An aircraft installed snow remover having blowing apparatus for particularly gas e.g. high pressure air toward snow laid and/or lying on any surface of aircraft, as a result it realizes an advantage allowing aircraft to get snow removal service at any time by itself without requiring assistance to be rendered by specially designed snow removing vehicles, further, as a result it satisfies a requirement to keep smooth flight operation.

9 Claims, 3 Drawing Sheets

AIRCRAFT INSTALLED SNOW REMOVER

FIELD OF THE INVENTION

This invention relates to aircraft installed snow remover which is an apparatus to blow snow laid and/or lying on any surface of aircraft such as wings, elevators.

BACKGROUND OF THE INVENTION

When it snows on airport, as aircraft landed thereon is usually staying at apron in open space, snow lies on any upper surface of aircraft including fuselage, wings, elevators, et al. Thus, it is necessary to remove snow laid on aircraft before it takes off. For this purpose, heretofore vehicles specifically designed to remove snow is employed to spray snow melting fluid or gas toward aircraft for snow removing.

Unavoidable in the prior art are drawbacks presented below:

1. A fairly long time, for example, approximately 1 through 2 hours is required to complete snow removal service for one aircraft.
2. Due to the quite usual limited quantity of snow removing vehicles available at an airport, aircraft sometimes incur fairly long waiting time to get snow removal service.
3. These factors cause a remarkable magnitude of delay for taking off of aircraft as a result it makes remarkable magnitude of confusion for flight operation.

SUMMARY OF THE INVENTION

The object of this invention is to provide aircraft which realizes to solve above drawbacks and to get advantage of reducing time spent for snow removal service, as a result it causes remarkable magnitude of advantage to keep flight schedule.

The above stated object of the invention is attained by aircraft in which snow remover is installed. The snow remover comprises blowing apparatus to blow high pressure gas, gaseous fluid, or other things to blow out and/or to melt snow laid and/or laying on any surface of aircraft to remove said snow therefrom. The blowing apparatus for high pressure gas which is arranged on aircraft allows it to get snow removal service at any time by itself without depending on assistance rendered by snow removing vehicles and realizing ultimate advantage which causes smooth and economical flight operation.

The newly introduced blowing apparatus to blow high pressure gas toward snow laid and/or lying on any surface of aircraft such as wings and elevators, can be arranged in at least one of portion on the surface of aircraft including root of wing, root of elevator, middle portion of wing with respect to longitudinal direction and middle portion of wing with respect to sidewise direction.

The blowing apparatus to blow high pressure gas toward snow laid and/or lying on any surface of aircraft can be such apparatus having at least one nozzle from which said high pressure gas is blown, and which is rotatable so that the area covered by said nozzle is increased, and which is exposed upon use for snow removal and which is retracted when it is not used so that the surface of aircraft can be flat to reduce air resistance in flight.

The blowing apparatus is allowed to utilize compressed gas supplied by a compressor which is arranged in the aircraft itself and driven by engines of aircraft.

The blowing apparatus is also allowed to employ a detachable stationary compressor prepared at airport, in addition to, or other than the above described compressor arranged on aircraft itself.

BRIEF DESCRIPTION OF DRAWINGS

This invention, together with its various features and advantages, can be readily understood from the following more detailed description presented in conjunction with following drawings, in which.

DETAILED DESCRIPTION OF INVENTION

Detailed description will be presented below for aircraft installed snow remover in accordance with one embodiments of the invention.

Figure 1:
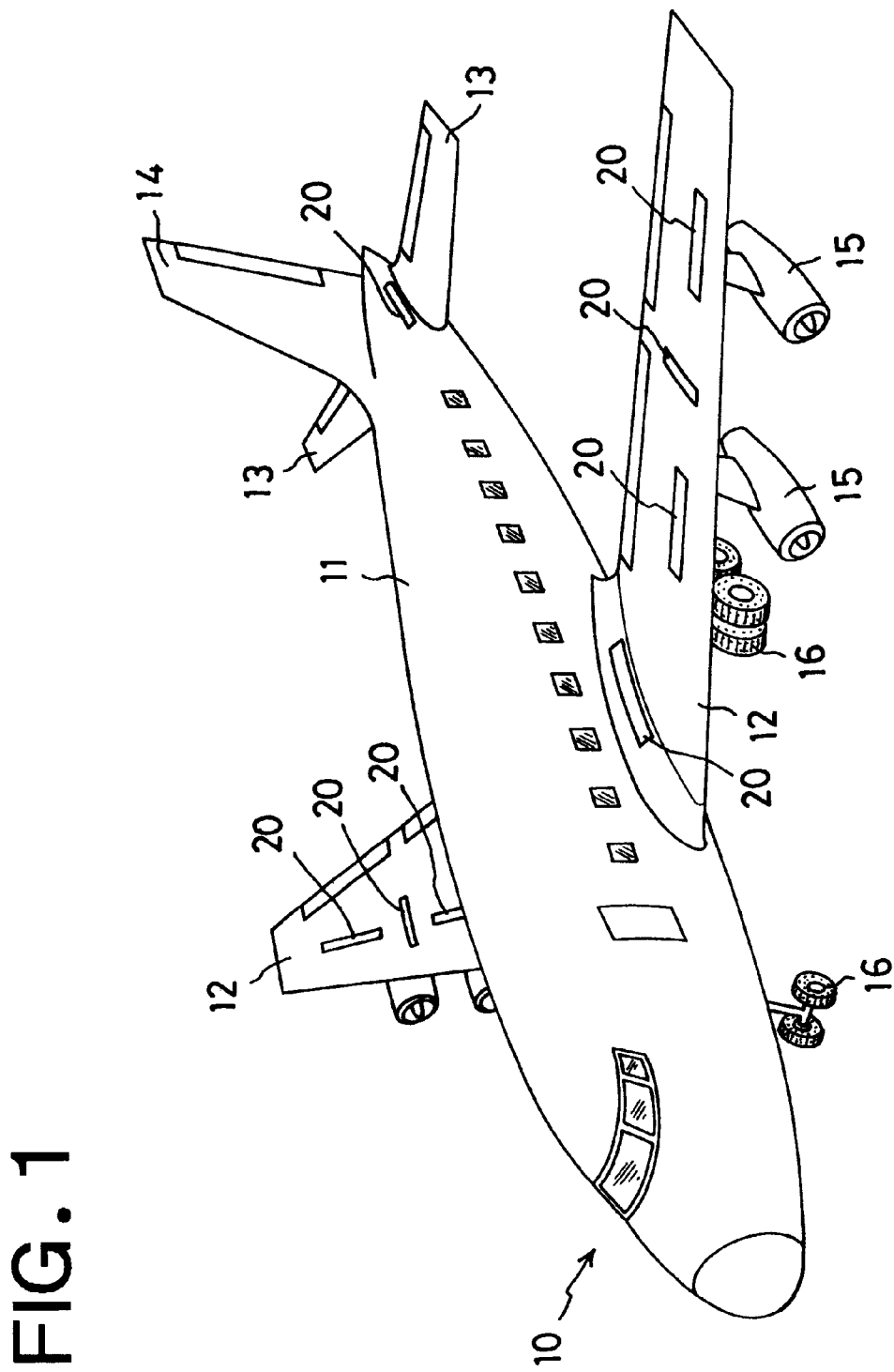
FIG. 1 is a perspective view of aircraft installed snow removers in accordance with one embodiment of present invention.
Figure 2:
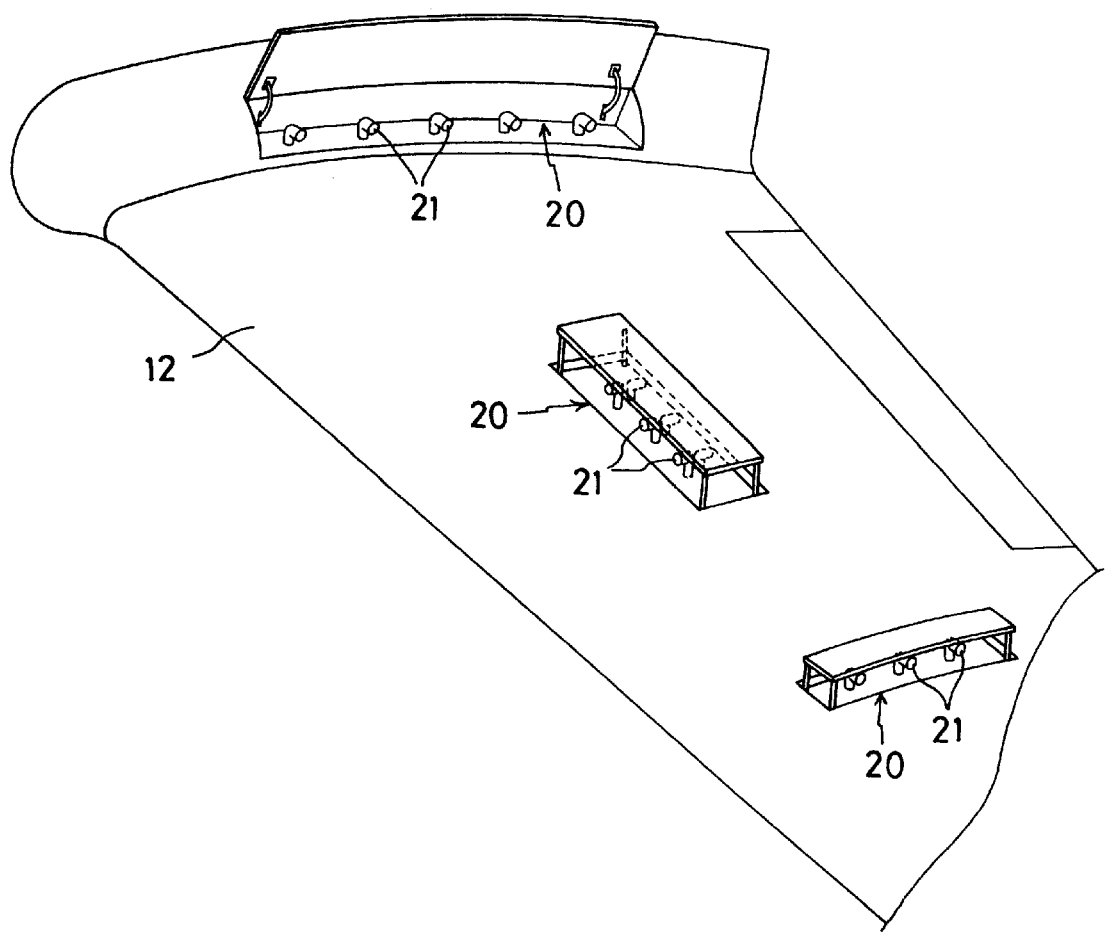
FIG. 2 is a partial perspective view of wing of the aircraft installed snow remover in accordance with present invention in which the snow removers are arranged to a root and middle portion of wing.
Figure 3:
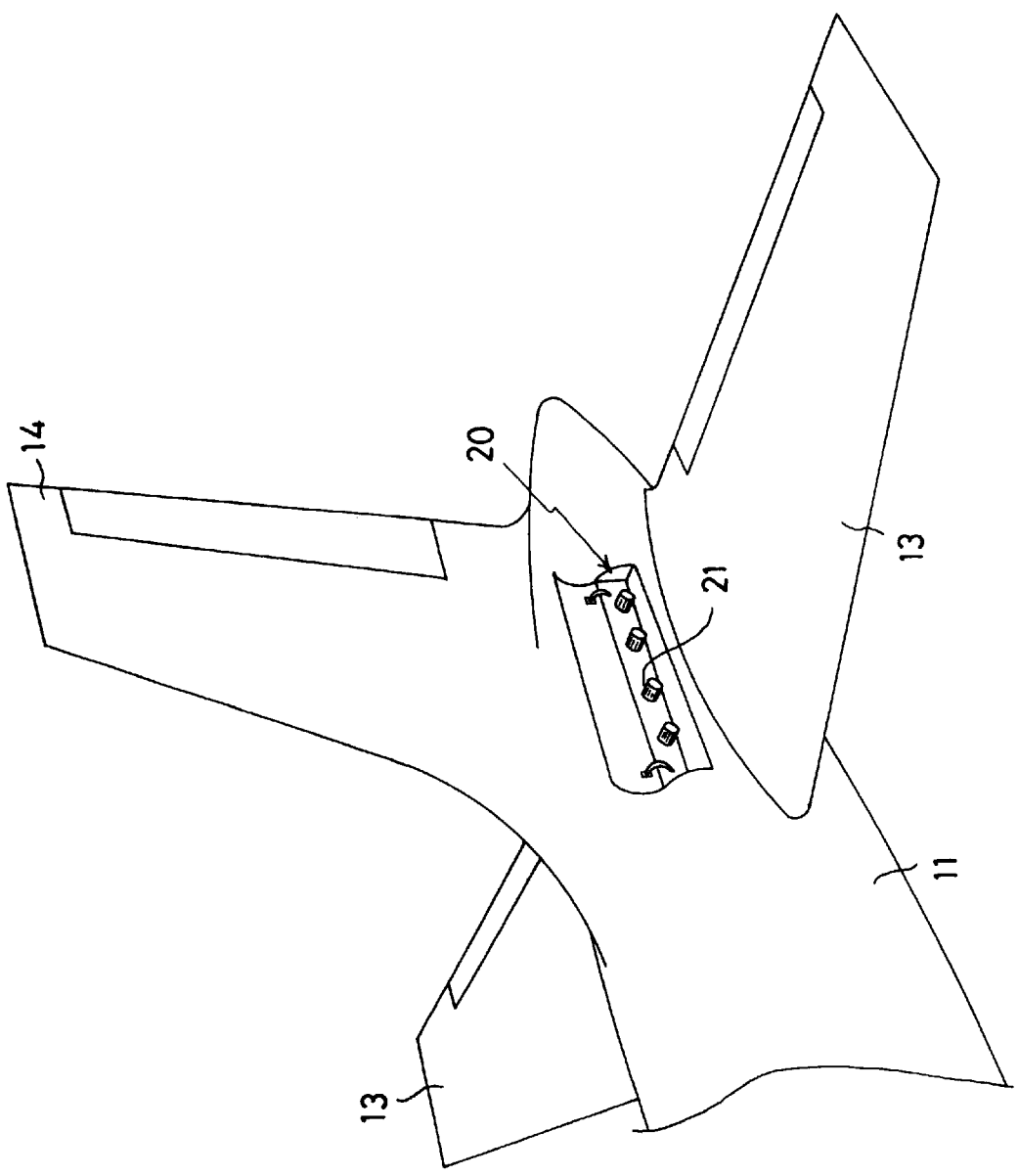
FIG. 3 is a partial perspective view of tail of the aircraft installed snow removers in accordance with present invention in which the snow removers are arranged to a root of elevators of the aircraft.

Referring to FIGS. 1, 2 and 3, an airframe 10 is composed of a fuselage 11, wings 12, elevators 13, a rudder 14, engines 15, wheels 16 and so on. The fuselage 11 is a tubular object having a nearly circular cross section and having a function to accommodate passengers and crew as well as freight. The wings 12 extend sideways from middle portion of both sides of the fuselage 11. A pair of elevators 13 and rudder 14 extend respectively sideways and upright at a tail of fuselage 11. The wheels 16 and engines 15 are arranged usually at the lower surface of the fuselage 11 and the wings 12.

In this embodiment, the blowing apparatus 20 which blow high pressure gas toward snow laid and/or lying on any upper surface of aircraft, are arranged several places of the aircraft, such as fuselage 11 including roots of the wings 12 and the elevators 13, middle portions of the wings 12 with respect to longitudinal direction and middle portions of the wings 12 with respect to sideways direction.

For the purpose to give much strength to the blowing apparatus 20, they are preferably arranged to any part reinforced by beam et al. It is needless to emphasize that the blowing apparatus 20 arranged to roots of the wings, can be arranged to a slightly upward portion of one side of the fuselage 11 facing root of the wing 12, as the structure of the blowing apparatus arranged for the elevators 13 is shown in FIG. 3.

Although FIG. 1 shows that several blowing apparatus 20 are arranged to each wing 12 and each elevator 13 of aircraft, however, the FIG. 1 has no limiting intention and any quantity of the blowing apparatus 20 can be arranged to any proper place of aircraft.

Two different types of structure for the blowing apparatus 20 are shown in the FIG. 2. One is a type with cover which is hinged at one side of the fuselage 11 to cover nozzles 21 from which high pressure gas is blown. The cover is closed when the blowing apparatus 20 is not in use.

And other is a type whose nozzles are retracted within the wing 12 when they are not in use. The opening of the cover may be limited to an extent that nozzles 21 are exposed to blow the high pressure gas.

As shown in FIG. 2 the blowing apparatus 20 has at least one nozzle 21 with L shaped or I shaped. And the nozzle is rotatable to allow gas blown widely toward snow laid and/or lying on any surface of aircraft such as wings 12 and elevators 13. As it has been already referred to the structure of the blowing apparatus 20, the nozzles 21 are covered or retracted in the fuselage 11 or within the wing 12 after the snow removal service is completed in order to make the surface of fuselage and wing flat.

In this embodiment, to supply high pressure gas, the blowing apparatus 20 employs a compressor (not shown) which is arranged in the aircraft and driven by engines of the aircraft. However, the compressor need not to be arranged within the aircraft itself because it is used only when the aircraft is not flying. The compressor may be prepared at airport as a detachable stationary compressor that is employed to supply high pressure gas. The detachable stationary compressor can be diverted from any high pressure supplier which is usually utilized in airport. This embodiment of detachable compressor decreases weight of aircraft and increases the snow removal ability by employing much powerful compressor which is too large to be arranged in aircraft.

When it begins snowing and lying on any upper surface of aircraft such as wing 12 and elevator 13, or when it is found snow laid on any upper surface such as wing 12 and elevator 13 of aircraft, an operation of blowing apparatus 20 is begun properly under consideration to keep specified flight schedule of the aircraft.

For the embodiment in which the compressor is arranged within aircraft itself, firstly one or in case two of the engines 15 in both sides are started and the compressor (not shown) on aircraft is in operation. Then, covers for nozzles 21 of the blowing apparatus 20 are going to be opened to expose them and the blowing apparatus 20 is ready to work. After the covers are fully opened in order to expose the nozzles 21, high pressure gas begins to be blown toward the snow laid and/or lying on any surface of aircraft such as wing and elevator. The nozzle 21 of blowing apparatus 20 is rotated so that the direction of blown gas can be changed to increase area of snow removed.

When degree of the snow falling is not so much, blowing of high pressure gas is enough to attain the purpose of snow removal. On the contrary, when the degree of the snow falling is much heavy, gas to be blown may be heated by any heating means and the high pressure gas get high temperature for quick snow melting. In certain time length of operation above described, the snow laid on aircraft is melted little by little and finally the entire quantity of snow laid on aircraft is removed.

When one or in case two of the engines 15 in both sides are utilized to produce high pressure gas, a less magnitude of energy consumption can be expected.

For the embodiment in which the compressor is prepared at airport other than the compressor is arranged in aircraft itself, firstly an outlet pipe of the compressor is jointed closely to an inlet hole of the blowing apparatus of aircraft and the compressor (not shown) is in operation. Then, covers for nozzles 21 of the blowing apparatus 20 are going to be opened. The consecutive operation is quite the same as the above stated embodiment in which the compressor is arranged within aircraft and explanation for it is neglected to avoid repetition.

For the embodiment in which the compressor is prepared at airport in addition to the compressor arranged in aircraft itself, both of above stated steps are jointly executed.

After completion of the snow removal service, the nozzles 21 are covered or retracted in the fuselage 11 or within the wing to be ready for taking off.

The foregoing description has clarified that aircraft installed snow remover of this invention is allowed to conduct the preparatory job for taking off by itself without requiring assistance to be rendered by specially designed snow removing vehicles, as a result satisfying the requirement of smooth flight operation realized by strictly keeping time schedule of taking off.

The remarkable advantages provided by this invention of aircraft installed snow remover would be itemized below.

Firstly, as aircraft provided with blowing apparatus of this invention can remove snow laid and/or lying on any surface such as wing and elevator by itself at any time, as a result realizing a smooth and economical operation for allowing aircraft taking off and lading.

Secondly, as the blowing apparatus of this invention can be arranged to several places of aircraft including the root of wing, the root of an elevator, the middle portion of the wing with respect to longitudinal direction and middle portion of the wing with respect to sidewise direction, it is convenient to conduct snow removal service, because any of the foregoing means can be selectively utilized depending on the location thereof.

Thirdly, as the blowing apparatus of this invention can be arranged with nozzles to be covered and/or retracted, snow removal service can be readily conducted without being affected to any physical characteristics of aircraft, especially to air resistance of it.

Fourthly, high pressure gas to be blown can be supplied by detachable stationary compressor prepared at airport, a more powerful and efficient operation of snow removal service can be realized. Especially this embodiment of utilizing detachable stationary compressor need not to be prepared at airport in off season to get much open space for maintenance and as described before, it is much economical when it is diverted from other high pressure supplier.

What is claimed is:

1. An aircraft installed snow remover comprising blowing apparatus to blow high pressure gas toward snow laid and/or lying on a surface of the aircraft to remove said snow therefrom when the aircraft is landed.

2. An aircraft installed snow remover in accordance with claim 1 characterized wherein, said blowing apparatus is arranged in at least one portion on the surface of aircraft including root of wing, root of elevator, middle portion of wing with respect to longitudinal direction and middle portion of wing with respect to sidewise direction.

3. An aircraft installed snow remover in accordance with claim 1 characterized wherein, said blowing apparatus has at least one nozzle which is rotatable and which is exposed upon use for snow removal and which is retracted to make the surface of aircraft flat.

4. An aircraft installed snow remover in accordance claim 1 characterized wherein, said gas to be blown by said blowing apparatus is supplied by compressor arranged in said aircraft.

5. An aircraft installed snow remover in accordance with claim 1 characterized wherein, said gas to be blown by said blowing apparatus is supplied by stationary compressor prepared at airport.

6. An aircraft installed snow remover comprising: a blowing apparatus selectively deployable from within the aircraft and having a plurality of nozzles from which jets of high pressure gas are directed toward snow lying on surfaces of the aircraft to remove said snow therefrom only when said aircraft is landed.

7. An aircraft installed snow remover in accordance with claim 6, further comprising a cover which selectively covers and conceals the plurality of nozzles when they are not in use.

8. An aircraft installed snow remover in accordance with claim 7, wherein the plurality of nozzles are retractable into a fuselage or wing of the aircraft.

9. An aircraft installed snow remover in accordance with claim 7, further comprising a heater to heat the air which is ejected by the plurality of nozzles.

\* \* \* \* \*